US007733622B2

(12) United States Patent
Ueda et al.

(10) Patent No.: US 7,733,622 B2
(45) Date of Patent: Jun. 8, 2010

(54) SURGE ABSORBER AND PRODUCTION METHOD THEREFOR

(75) Inventors: Toshiaki Ueda, Naka (JP); Miki Adachi, Naka (JP); Yasuhiro Shato, Chichibu-gun (JP); Tuyoshi Ogi, Chichibu-gun (JP); Takashi Kurihara, Chichibu-gun (JP); Sung-Gyoo Lee, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 576 days.

(21) Appl. No.: 10/546,832

(22) PCT Filed: Feb. 27, 2004

(86) PCT No.: PCT/JP2004/002445

§ 371 (c)(1), (2), (4) Date: Mar. 16, 2007

(87) PCT Pub. No.: WO2004/077632

PCT Pub. Date: Sep. 10, 2004

(65) Prior Publication Data

US 2007/0285866 A1 Dec. 13, 2007

(30) Foreign Application Priority Data

| | | | |
|---|---|---|---|
| Feb. 28, 2003 | (JP) | ............................. | 2003-053988 |
| Nov. 27, 2003 | (JP) | ............................. | 2003-397955 |
| Dec. 25, 2003 | (JP) | ............................. | 2003-431148 |
| Jan. 9, 2004 | (JP) | ............................. | 2004-004314 |

(51) Int. Cl.
*H02H 1/00* (2006.01)

(52) U.S. Cl. ....................................... 361/120; 361/111

(58) Field of Classification Search ................. 361/120, 361/111, 117
See application file for complete search history.

(56) References Cited

U.S. PATENT DOCUMENTS 4,355,345 A * 10/1982 Franchet ..................... 361/117

(Continued)

FOREIGN PATENT DOCUMENTS

JP 32783/1985 3/1985

(Continued)

OTHER PUBLICATIONS

Abstract for JP 04-043584. Feb. 1992.*

(Continued)

*Primary Examiner*—Jared J Fureman
*Assistant Examiner*—Christopher J Clark
(74) *Attorney, Agent, or Firm*—Oblon, Spivak, McClelland, Maier & Neustadt, L.L.P.

(57) ABSTRACT

This surge absorber includes an insulating part upon which is formed a conductive layer which is divided into two separate portions by a discharge gap (micro gap) around its circumferential surface; a pair of terminal electrodes which are arranged to oppose the insulating part, and contacts the conductive layer; an insulating tube at the ends of which the terminal electrodes are arranged, and which seals the insulating part in its interior along with seal gases; and a conductive portion provided at least between the terminal electrodes and the conductive layer. As a result, it becomes possible to provide a surge absorber of lower cost, and which is endowed with stabilized performance and high quality, while moreover it exhibits excellent durability.

16 Claims, 9 Drawing Sheets

U.S. PATENT DOCUMENTS 5,184,273 A * 2/1993 Tanaka et al. ............... 361/120

FOREIGN PATENT DOCUMENTS

| | | |
|---|---|---|
| JP | 63-318086 | 12/1988 |
| JP | 4-43584 | 2/1992 |
| JP | 5-6797 | 1/1993 |
| JP | 7-335368 | 12/1995 |
| JP | 9-92429 | 4/1997 |
| JP | 9-92430 | 4/1997 |
| JP | 9-171881 | 6/1997 |
| JP | 9-266052 | 10/1997 |
| JP | 10-106712 | 4/1998 |
| JP | 11-354245 | 12/1999 |
| JP | 2000-138089 | 5/2000 |
| JP | 2000-243534 | 9/2000 |
| JP | 2000-268934 | 9/2000 |
| JP | 2002-110311 | 4/2002 |
| JP | 2002-134247 | 5/2002 |
| JP | 2003-31337 | 1/2003 |

OTHER PUBLICATIONS

Abstract for JP 2000-138089. May 2000.*
Translation for Japanese Publication 2000-138089 (Application No. 10-298521). May 2000. The foreign patent document was submitted by Applicant on Aug. 25, 2005.*
U.S. Appl. No. 11/692,610, filed Mar. 28, 2007, Shato, et al.

* cited by examiner

SURGE ABSORBER AND PRODUCTION METHOD THEREFOR

FIELD OF THE INVENTION

The present invention relates to a surge absorber which is used for protecting various electronics devices from surges, and which prevents malfunctions before they can happen.

BACKGROUND ART

It is per se known to connect, in the connecting portion between an electronic device which is used as a communication device, such as a telephone set, a facsimile, a modem or the like, and a telecommunication line or a power line, an antenna, or a CRT monitor drive circuit or the like, a surge absorber for protecting electronic components within the device or a printed circuit board to which such components are mounted against destruction due to thermal damage or fire or the like caused by abnormal voltage being applied to portions of the device which can easily suffer electric shock by an abnormal voltage (surge voltage) or abnormal current (surge current) such as lightning surge or electrostatic or the like.

In the prior art, as for example disclosed in Japanese Patent Application, First Publication No. Hei 9-171881, there has been proposed a surge absorber of the discharge type, comprising: element housed within a glass tube, and provided with terminal electrodes at both its ends; a pair of Dumet wires which are inserted into the two ends of the glass tube, and each of which is connected to one of the terminal electrodes, each of them having its ends connected to a lead wire for connection to an external circuit; and cylindrical tube shaped spacers which, along with each surrounding and holding the Dumet wires, are inserted into both the end portions of the glass tube, and seal both end portions of the glass tube. In this case, fluctuations in DC spark over voltage because of the contact between the Dumet wires and the terminal electrodes becoming unstable can easily occur. Furthermore, this surge protector is unreasonable from the point of view of cost, since the cast of materials increase for the larger terminal electrodes.

Furthermore, the electronic devices become more compact, the surface mounted discharge type surge absorber become more popular. A surface mounted surge absorber (of the Murph type) is equipped with terminal electrodes which have no lead wires, and when being mounted upon a substrate, the terminal electrodes are connected to the substrate by soldering. In this type of surge absorber, as for example disclosed in Japanese Patent Application, First Publication Nos. 2002-110311 and 2002-134247, has a surge absorption element with a micro gap. An example of the structure of this type of surge absorber is shown in FIG. 10.

A surge absorption element 1 consists of a ceramic part (insulating part) 3 of circular cylindrical form, upon the circumferential surface of which there is spread a conductive layer 2, with a so called micro gap M being formed at the central portion of this conductive layer 2, and with a pair of cap electrodes being fitted to both ends of this ceramic part 3. This surge absorption element 1 is housed within a glass tube 5 which is filled with seal gases G, and the two ends of this glass tube 5 are sealed by heating at a high temperature by a pair of terminal electrodes 6, thus constituting the discharge type surge absorber.

In recent years, the demand has become more strident for provision of a lower cost surge absorber which, in addition to providing stabilized performance and high quality, is also endowed with durability and high surge resistance capability.

Consequently, there have arisen problems with relation to dimensional accuracy of the surge absorption element and the glass tube and the terminal electrodes, and, in particular, a crucial technical assignment has arisen with regard to preventing the occurrence of gaps between the surge absorption element and the enclosing electrodes, and with regard to maintaining secure and reliable contact between the surge absorption.

Furthermore, in recent years, with regard to surge absorbers, a sufficiently responsive performance has been demanded even for applications which require a high surge current capability, as when connecting a telecommunication line or a power supply line or the like. Furthermore, with a Murph type surge absorber, there is a possibility of breaking the glass tube during surface mounting. Due to this, it has been considered to replace the glass tube with a ceramic tube. With a surge absorber which uses a glass tube, the ceramic part is inserted into the glass tube, and after the terminal electrodes have been placed at both ends of the glass tube, in that state, the glass tube is melted in a high temperature oven, and the terminal electrodes are tightly fixed to glass tube so that thereby the glass tube is sealed. When the glass tube is cooled after seal process a sufficiently good ohmic contact is obtained between the terminal electrodes and the conductive layer of the ceramic part, since a residual stress force is set up in the compression direction owing to the thermal expansion coefficient differences between glass tube and ceramic part.

However, when a ceramic tube substitutes for the glass tube, since the thermal expansion coefficients differences of the ceramic tube and the ceramic member is comparatively small as compared with the situation described above, the residual stress which is generated during cooling process is small, so that it may occur that insufficiently good ohmic contact is provided between the terminal electrodes and the conductive layer of the ceramic part. In such a case, the electrical properties of the surge absorber, such as DC spark over voltage, become unstable.

The present invention has been conceived in the light of the above circumstances, and its objective is to provide a lower cost surge absorber which is endowed with excellent durability and a high surge current capacity, and which exhibits stable performance and high quality.

SUMMARY OF THE INVENTION

With the present invention, the following structure is utilized in order to solve the problems described above.

That is, the present invention proposes a surge absorber, comprising: an insulating part upon which is formed a conductive layer which is divided into two separate portions by a discharge gap (micro gap); a pair of terminal electrodes which are arranged to oppose the insulating part, and each of which contacts one of the two portions of the conductive layer; an insulating tube at the ends of which the terminal electrodes are arranged, and which seals the insulating part in its interior along with a seal gases; and a conductive portion provided at least between each of the terminal electrodes and the conductive layer.

For example, the surge absorber according to this aspect of the present invention may comprise: the insulating part, which is of columnar form, upon which is formed the conductive layer which is divided into the two separate portions by the discharge gap around its circumferential surface; the pair of terminal electrodes which are arranged to oppose the conductive layer at both ends of the insulating part; the insulating tube which seals the insulating part in its interior along with the seal gases; and a conductive filling material which acts as the conductive portion, and which fills up a gap between the conductive layer and the terminal electrode.

With this surge absorber, uneven gap which are caused between the contacting faces of the terminal electrode and the conductive layer due to dimensional inaccuracies, damage, and deformation during machining are filled up by the conductive filler material. Due to this, it is possible to obtain sufficiently good ohmic contact between the terminal electrode and the conductive layer, and the electrical properties of this surge absorber, such as DC spark over voltage and so forth, are stable.

Furthermore, the surge absorber according to the present invention may comprise: the insulating part, which is of columnar form, upon which is formed the conductive layer which is divided into the two separate portions by the discharge gap around its circumferential surface; the pair of terminal electrodes which are arranged to oppose the conductive layer at both ends of the insulating part; the insulating tube which seals the insulating part in its interior along with the seal gases; a metallic part which is arranged between the conductive layers and the terminal electrode; and a conductive filling material which acts as the conductive portion, and which fills up a gap between the metallic part and the terminal electrode.

With this surge absorber, uneven gap which are caused between the contacting faces of the terminal electrode and the conductive layer due to dimensional inaccuracies, damage, and deformation during machining are filled up by the conductive filler material. Due to this, it is possible to obtain sufficiently good ohmic contact between the terminal electrode and the conductive layer, and the electrical properties of this surge absorber, such as DC spark over voltage and so on, are stable.

Furthermore, with this surge absorber, it is desirable to form an oxide layer by oxidation process upon the arc discharge electrode surfaces, which are the mutually confronting surfaces of the pair of metallic parts.

With this surge absorber, abnormal current or abnormal voltage such as a lightning surge or the like which intrudes from externally, which discharge across the micro gap, and are absorbed by arc discharge between the arc discharge electrode surfaces, which are the mutually confronting surfaces of the pair of metallic parts. Here, by forming an oxide layer upon these arc discharge electrode surfaces, the arc discharge electrode surfaces are obtained which are excellent with regard to exhibiting chemical stability in the high-temperature region. Accordingly, during arc discharge, it is possible to prevent sputtering of the electrode components of the arc discharge electrode surfaces, and deposition thereof to the discharge gap or to the inner walls of the insulating tube, so that it is possible to anticipate enhancement of the service life of this surge absorber. Furthermore, since this oxide layer is excellent with regard to adhesion strength to the arc discharge electrode surfaces, it is accordingly possible to display the above described characteristic to full advantage. Yet further, it is possible to utilize a lower cost material for the metallic part, since it is not necessary to utilize, for this metallic part, a higher cost metal which has excellent chemical stability in the high temperature region.

Furthermore, with this surge absorber, the desirable average film thickness of the oxide layer is 0.01 μm or greater.

With this surge absorber, by utilizing an oxide layer whose average film thickness is 0.01 μm or greater, it is possible sufficiently to suppress sputtering of the electrode component of the metallic part due to the arc discharge.

Furthermore, with this surge absorber, it is desirable to provide a support portion which is formed to project from the terminal electrode within the insulating tube in the axial direction thereof, and which supports the insulating part.

With this surge absorber, the insulating part, by being supported by the support portion, comes to be reliably located in the vicinity of the center of the terminal electrode, or in the surrounding portion thereof. As a result, DC spark over voltage is stabilized, and displacement of the insulating part towards the side of the end portion of the terminal electrode is prevented, so that it is possible to anticipate an enhanced service life for this surge absorber.

Furthermore, with this surge absorber, it is desirable for the total pressure of the seal gases be below atmospheric pressure.

With such a surge absorber, by ensuring that the pressure of the seal gases is below atmospheric pressure, when the insulating tube has been sealed and has cooled down, a residual stress in the compression direction is generated between the two terminal electrodes by the pressure of the atmosphere which is now higher than the total pressure of the seal gas. It is possible to obtain a better and more secure ohmic contact between the conductive layer and the terminal electrodes, due to this stress in the compression direction.

Furthermore, the surge absorber of the present invention may comprise: the insulating part, which is of columnar form, upon which is formed the conductive layer which is divided into the two separate portions by the discharge gap around its circumferential surface; the pair of terminal electrodes which are arranged to oppose the conductive layer at both ends of the insulating part; the insulating tube, at both ends of which the pair of terminal electrodes are arranged by being bonded with a solder, and which seals the insulating part in its interior along with the seal gases; and the conductive portion, which is made from a conductive bonding material, and which bonds the terminal electrodes and the conductive layer.

With this surge absorber, by bonding the terminal electrodes and the conductive layer with the conductive bonding material, it is possible to obtain a sufficiently good ohmic contact between the terminal electrodes and the conductive layer, so that the electrical properties of the surge absorber, such as DC spark over voltage and so on, are stabilized. Furthermore, by fixing the insulating part to the vicinity of the central portion of the terminal electrode, or to the surrounding portion thereof, it is possible to stabilize the DC spark over voltage of the surge absorber, thus making it possible to anticipate an enhanced service life therefor.

Furthermore, the surge absorber of the present invention may comprise: the insulating part, which is of columnar form, upon which is formed the conductive layer which is divided into the two separate portions by the discharge gap around its circumferential surface; the pair of terminal electrodes which are arranged to oppose the conductive layer at both ends of the insulating part; the insulating tube, at both ends of which the pair of terminal electrodes are arranged by being bonded with a solder, and which seals the insulating part in its interior along with the seal gases; a metallic part which is disposed between the terminal electrodes and the conductive layer; and the conductive portion, which is made from a conductive bonding material, and which bonds the metallic part and the terminal electrodes.

With this surge absorber, by bonding the terminal electrodes and the metallic part with the conductive bonding material, it is possible to obtain a sufficiently good ohmic contact between the terminal electrodes and the metallic part, so that the electrical properties of the surge absorber, such as DC spark over voltage and so on, are stabilized. Furthermore, by fixing the insulating part to the vicinity of the central portion of the terminal electrode, or to the surrounding portion thereof, it is possible to stabilize the DC spark over voltage of the surge absorber, thus making it possible to anticipate an enhanced service life therefor.

Furthermore, with this surge absorber, it is desirable to form an oxide layer by oxidation process upon the arc discharge electrode surfaces, which are the mutually confronting surfaces of the pair of metallic parts.

With this surge absorber, abnormal current or abnormal voltage such as a lightning surge or the like which intrudes from externally, which discharge across the micro gap, and the surge is absorbed by arc discharge between the arc discharge electrode surfaces, which are the mutually confronting surfaces of the pair of metallic parts. Here, by forming an oxide layer upon these arc discharge electrode surfaces, arc discharge electrode surfaces are obtained which are excellent with regard to exhibiting chemical stability in the high-temperature region. Accordingly, during arc discharge, it is possible to prevent sputtering of the electrode components of the arc discharge electrode surfaces, and deposition thereof to the discharge gap or to the inner walls of the insulating tube, so that it is possible to anticipate enhancement of the service life of this surge absorber. Furthermore, since this oxide layer is excellent with regard to adhesion strength to the arc discharge electrode surfaces, it is accordingly possible to display the above described characteristic reliably to full advantage. Yet further, it is possible to utilize lower cost material for the metallic part, since it is not necessary to utilize, for this metallic part, a higher cost metal which has excellent chemical stability in the high temperature region.

Furthermore, with this surge absorber, the desirable for the average film thickness of the oxide layer is 0.01 μm or greater.

With this surge absorber, by utilizing an oxide layer whose average film thickness is 0.01 μm or greater, it is possible sufficiently to suppress sputtering of the electrode component of the metallic part due to the arc discharge.

Furthermore, with this surge absorber, it is desirable for the solder and the bonding material to be formed from different materials.

With this surge absorber, by forming the solder and the bonding material out of different materials, it is possible to selectively utilize the material having the most suitable bonding strength, when bonding the terminal electrodes and the conductive layer, when bonding together the terminal electrodes and the metallic part, and when bonding the terminal electrodes and the insulating tube.

Furthermore, it is desirable for this surge absorber further to comprise a support portion which is formed to project from each of the terminal electrodes within the insulating tube along the axial direction of the insulating tube, and which supports the insulating part.

With this surge absorber, by supporting the insulating part with the support portion, it becomes securely positioned in the vicinity of the central portion of the terminal electrode, or in the surrounding portion thereof. As a result, DC spark over voltage of the surge absorber is stabilized, and, by preventing the insulating part from deviating towards the side edge of the terminal electrode, it becomes possible to anticipate an enhanced service life for this surge absorber.

Furthermore, it may be desirable for the support portion to be formed from a material which is the same as the solder and which is different from the bonding material.

Or, it may be desirable for the support portion to be formed from a material which is the same as the bonding material, and which is different from the solder.

With this surge absorber, by making the support portion and the solder or the bonding material, from the same material, it becomes possible to manufacture the surge absorber easily while minimizing the number of types of components required therefor.

Or, it may be desirable for the support portion to be formed from a material which is different from both the bonding material and the solder.

With this surge absorber, by utilizing a material which has a poor affinity for (i.e. is not easily wetted by) the conductive layer or the metallic part, the terminal electrodes, the bonding material, and the solder thereby, when the sealed insulating tube is cooled, the height by which the support portion bulges upwards is increased. Accordingly, it is possible further to stabilize the insulating part.

Furthermore, with this surge absorber, it is desirable for the total pressure of the seal gases to be below atmospheric pressure.

With such a surge absorber, by ensuring that the total pressure of the seal gases is below atmospheric pressure, when the insulating tube has been sealed and has cooled down, a residual stress in the compression direction is generated between the two terminal electrodes by the pressure of the atmosphere which is now higher than the total pressure of the seal gas. It is possible to obtain a better and more secure ohmic contact between the conductive layer and the terminal electrode, due to this stress in the compression direction.

Furthermore, the surge absorber according to the present invention may comprise the insulating part, which is of columnar form, upon which is formed the conductive layer which is divided into the two separate portions by the discharge gap around its circumferential surface; the pair of terminal electrodes which are arranged to oppose the conductive layer at both ends of the insulating part; the insulating tube; and a conductive cushion part, which acts as the conductive portion, and which is provided between the conductive layer and the terminal electrode.

According to this surge absorber, since the conductive cushion part is provided between the end surface of the conductive layer and the terminal electrode, dimensional tolerances are absorbed by compression of the cushion part, and it is possible reliably to connect the end surface of the conductive layer and the terminal electrode via the cushion part. Accordingly, without any requirement for implementation of very severe dimensional tolerances, it is possible to manufacture nigh quality and lower cost surge absorber which has a stabilized electrical properties, and which can conduct surge current reliably between the conductive layer and the terminal electrodes.

The arrangement of the above described cushion part is particularly suitable for a surge absorber according to the present invention in which both the end surfaces of the insulating tube are bonded to the terminal electrodes.

Furthermore, the cushion part may be made from any one of metallic plate, metallic foil, foamed metal, and metallic fibers.

Furthermore, it is desirable to provide, to the cushion part, a swollen portion which supports the insulating part by its outer circumferential surface at its end which corresponds to the cushion part.

Since the insulating part is reliably held in place by providing to the cushion part the swollen portion which supports the end of the insulating part by its outer circumferential surface, accordingly a surge absorber is obtained which has a stabilized DC spark over voltage, even if for example this surge absorber is used in a vibration environment.

Furthermore, the present invention proposes a method for manufacture of such a surge absorber which comprises: the insulating part, which is of columnar form, upon which is formed the conductive layer which is divided into the two separate portions by the discharge gap around its circumferential surface; the pair of terminal electrodes which are arranged to oppose the conductive layer at both ends of the insulating part; and the insulating tube, at both ends of which the pair of terminal electrodes are arranged, and which seals the insulating part in its interior along with the seal gases: and wherein a conductive cushion part is provided between the end surface of the conductive layer and the terminal electrode, and the terminal electrodes being bonded to both ends of the insulating tube.

According to the production method, it is possible to absorb dimensional tolerances by compression of the cushion part which receives the pressing force of the terminal electrode, and it is possible reliably to connect together the end surface of the conductive layer and the terminal electrode via the cushion part. Accordingly, without any requirement for implementation of very severe dimensional tolerances, it becomes possible to manufacture the nigh quality and lower cost surge absorber, which has a stabilized electrical properties, and which can conduct surge current reliably between the conductive layer and the terminal electrodes.

BEST MODE FOR CARRYING OUT THE INVENTION

Figure 1A:
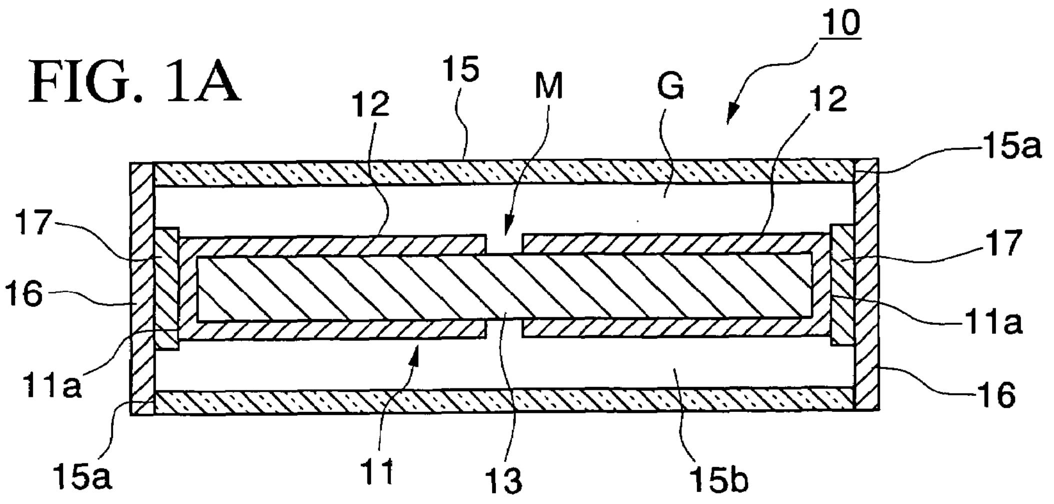
FIG. 1A is a cross sectional view showing a surge absorber according to a first preferred embodiment of the present invention.

In the following, first preferred embodiments of the surge absorber according to the present invention and of a production method thereof will be explained with reference to FIGS. 1 and 2. It should be understood that FIG. 1A is a cross sectional view of this surge absorber, while FIG. 2 is an exploded perspective view of the parts show in cross sectional view in FIG. 1A.

The surge absorber 10 of this first preferred embodiment is a so called discharge type surge absorber which utilizes a micro gap (discharge gap), and, along with housing a surge absorption element 11 together with seal gases G within a tube shaped ceramic part 15 (which is an insulating tube), with the tube shaped ceramic part 15 being sealed by each of two terminal electrodes 16 being bonded to each of two end surfaces 15*a* of the insulating tube 15.

This tube shaped ceramic part 15 is made by forming an insulating part such as, for example, a ceramic or a lead glass or the like as a quadrangular hollow pillar. In a hollow portion 15*b* of the tube shaped ceramic part 15 there is housed, together with the seal gases G, the surge absorption element 11 which will be described hereinafter, and both the end portions 15*a* of the tube shaped ceramic member 15 are sealed by the pair of terminal electrodes 16. In other words, the hollow part 15 constitutes an airtight chamber, within which the surge absorption element 11 and the seal gases G are sealed.

Furthermore, Ni (nickel) plate is coated upon both the end surfaces 15*a* of the tube shaped ceramic part 15, after metallization process with, for example, Mo (molybdenum)-Mn (manganese). It should be understood that the both the metalized end surfaces 15*a* is not limited to being Mo (molybdenum)-Mn (manganese); for example, it would also be possible to utilize Mo (molybdenum)-W (tungsten), Ag (silver), Cu (copper), Au (gold), or the like; and it would also be acceptable not to coat the Ni (nickel) plate. Alternatively, instead of forming a metallized layer, it would also be possible to utilize an activated silver solder or a glass material upon the two end surfaces 15*a*.

Here, as an example of an insulating part which may be utilized for the tube shaped ceramic member 15, there may be proposed, for example, an insulating ceramic such as $Al_2O_3$ (alumina), $ZrO_2$ (zirconia), glass ceramic, $Si_3N_4$ (silicon nitride), AlN (aluminum nitride, SiC (silicon carbide), or the like.

Furthermore, with regard to the seal gases G, although it is possible to utilize any gas, including air, providing that it is ionized at high temperature, in consideration of stability at high temperature, it is desirable to use a gas which is one of, for example, He (helium), Ar (argon), Ne (neon), Xe (xenon), $SF_6$, $CO_2$ (carbon dioxide), $C_3F_8$, $C_2F_6$, $CF_4$, $H_2$ (hydrogen), or the like, or a mixture of two or more thereof.

The surge absorption element 11 is made by spreading a conductive layer 12, which is a thin film of Ti (titanium) or the like, all over the entire surface of the circular cylindrical shaped ceramic part (the insulating part) 13, except for a micro gap M which is machined as a circumferential discharge gap around its central portion.

This micro gap M is a portion in the vicinity of the central portion in the axial direction of the circular cylindrical shaped ceramic part 13 where the conductive layer 12 is removed all around it in the circumferential direction, thus leaving the circular cylindrical shaped ceramic part 13 exposed all around its circumferential direction. As a result, the conductive layer 12 is divided into two portions by this micro gap M, and these two portions thereof come to be in the state of being mutually insulated from one another. The machining of this type of discharge gap M can be performed by utilizing laser cutting, dicing, etching, or the like. It should be understood that the discharge gap M may be formed with a width of from about 0.01 to about 1.5 mm, and that around 1 to 100 of them may be formed.

The circular cylindrical shaped ceramic part 13 is made from an insulating ceramic such as, for example, mullite sintered body or the like, or, alternatively, an insulating ceramic such as, for example, $Al_2O_3$ (alumina), $ZrO_2$ (zirconia), glass ceramic, $Si_3N_4$ (silicon nitride), AlN (aluminum nitride), SiC (silicon carbide), or the like may be utilized.

Furthermore, it is possible to utilize a physical vapor deposition (PVD) method or a chemical vapor deposition (CVD) method for coating the conductive layer 12. It should be understood that, for the conductive layer 12, apart from the above described Ti thin film, it would also be possible to utilize, for example, $SnO_2$ (tin oxide), TiCN (titanium carbonitride), Ag (silver), Ag (silver)/Pd (palladium), Al (aluminum), Ni (nickel), Cu (copper), TiN (titanium nitride), Ta (tantalum), W (tungsten), SiC (silicon carbide), Ba—Al, C (carbon), Ag (silver)/Pt (platinum), TiO2 (titanium oxide), TiC (titanium carbide), or the like.

Although, after having inserted the surge absorption element 11 of the above described structure into the hollow portion 15*b* of the tube shaped ceramic part 15, it is sealed in together with the seal gases G by bonding the terminal electrodes 16 to both the end surfaces 15*a*, at this time, conductive cushion parts (electrically conductive portions) 17 are arranged between the end surfaces 11*a* of the surge absorption element 11 and the terminal electrodes 16. Since these cushion parts 17 include rigid material, support material, and easily deformable material, in the following explanation, they will be generically termed “cushion parts”.

As the material for the terminal electrodes 16, for example, apart from “Kovar” (a registered trademark), Cu (copper), an alloy material of the Cu (copper) and Ni (nickel) family or the like may be utilized. These terminal electrodes 16 are connected to a circuit or the like which is to be protected from surges. It should be understood that, for the sealing of the terminal electrodes 16, brazing filler materials or solder or glass or the like may be used.

The cushion parts should be conductive members having moderate elasticity, and, as the material for them, for example, any of metallic plate or metallic foil, foamed metal, metallic fibers, or solder may be used.

Here, as a concrete examples of metallic plate or metallic foil, there may be suggested Ag (silver), Cu (copper), Al (aluminum), Au (gold), Ni (nickel), Pd (palladium), Sb (antimony), Zn (zinc), In (indium), Sn (tin), Pb (lead), Bi (bismuth), Ti (titanium), stainless steel, or an alloy containing two or more of these metals.

Furthermore, as the foamed metal, any substance will do, provided that it is in a multi-pore form, and that it is endowed with the characteristic of, when bonded to the tube shaped ceramic part 15 and to the terminal electrodes 16, being deformed by being pressed by the circular cylindrical shaped ceramic part 13 in which the micro gap M is formed. In concrete terms, as this foamed metal, although Ni (nickel), Cu (copper), Al (aluminum), Mg (magnesium), Co (cobalt), W (tungsten), Mn (manganese), Cr (chromium), Be (beryllium), Ti (titanium), Au (gold), Ag (silver), Fe (iron) alloy, Ni (nickel alloy) and the like are per se known, it would also be possible to utilize a metal which was used for the above described metallic plate or metallic foil, or an alloy of two or more thereof, as the metal to be foamed.

Furthermore, as the metallic fibers, any substance will do, provided that it is a metal which is formed into the form of fibers which are woven so as to exhibit a cushioning characteristic, and that it is endowed with the characteristic of, when bonded to the tube shaped ceramic part 15 and to the terminal electrodes 16, being deformed by being pressed by the circular cylindrical shaped ceramic part 13 in which the micro gap M is formed. In concrete terms, for this metallic fiber material, although metallic fibers of Ti (titanium), Al (aluminum), C (carbon), stainless steel and the like are per se known, it would also be possible to utilize metallic fibers of a metal which was used for the above described metallic plate or metallic foil, or an alloy of two or more thereof.

Furthermore, for example, Ag (silver)-Cu (copper), Ag (silver)-Cu (copper)-In (indium), Ag (silver)-Cu (copper)-Sn (tin) or the like may be suitable materials for these cushion parts 17.

With the surge absorber 10 of the above described structure, by sealing between the end surfaces 11*a* of the surge absorption element 11 and the terminal electrodes 16 in the state in which the cushion parts 17 are compressed, it becomes possible for stable conduction due to the secure contact between these members without any possibility of any gap developing. In other words, since it is possible to absorb dimensional errors in the surge absorption element 11 and in the tube shaped ceramic part 15 by the deformation of the cushion members 17, accordingly no gaps can occur between the terminal electrodes 16 and the end surfaces 11*a* upon which the conductive layer 12 is formed.

Due to this, a stabilized electrical properties can be obtained with very small deviations between different finish products, and accordingly a surge absorber 10 becomes high quality product from the point of view of durability, and reliability. Furthermore, since the dimensional tolerances of the surge absorption element 11 and the tube shaped ceramic part 15 can also be relaxed, the beneficial result is obtained that it is possible to reduce the production cost.

Figure 1B:
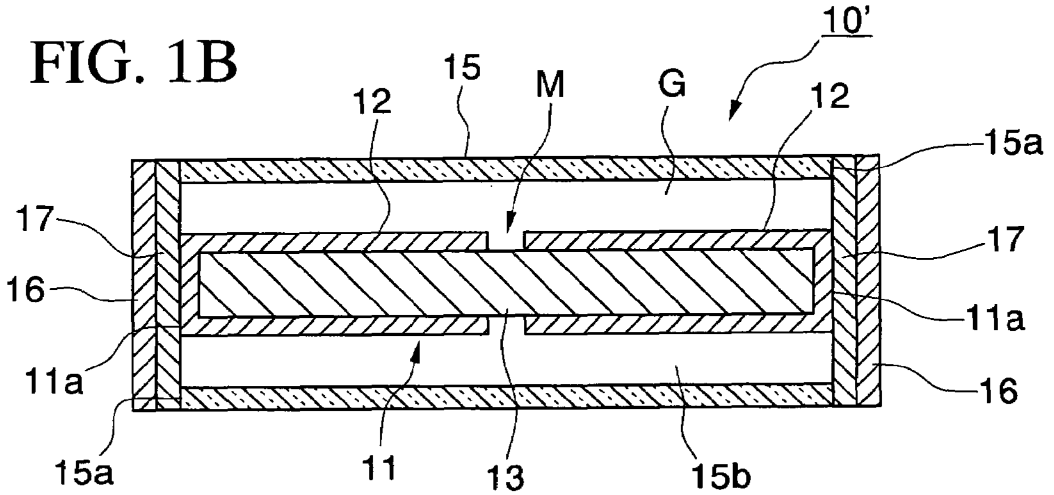
FIG. 1B is a cross sectional view showing a surge absorber according to a first variant of the first preferred embodiment of the present invention.
Figure 1C:
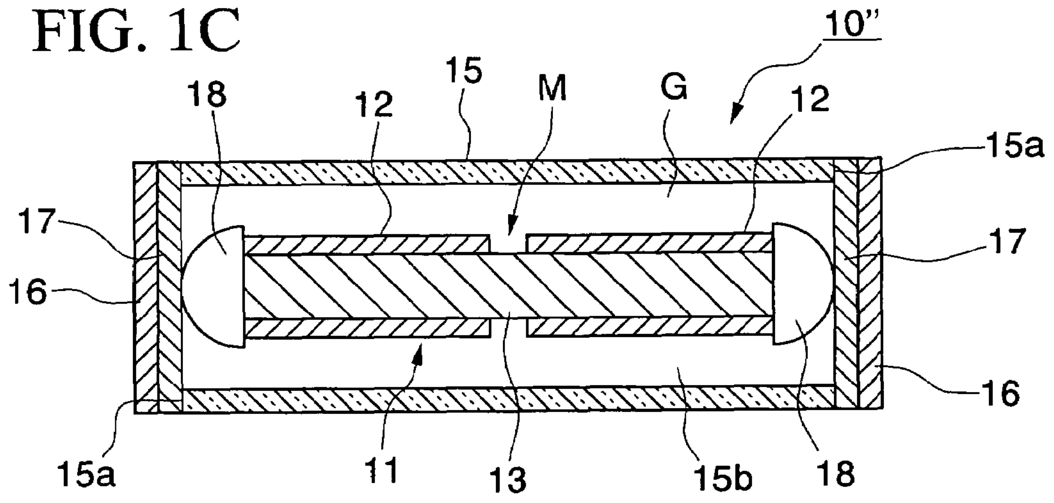
FIG. 1C is a cross sectional view showing a surge absorber according to a second variant of the first preferred embodiment of the present invention.
Figure 2:
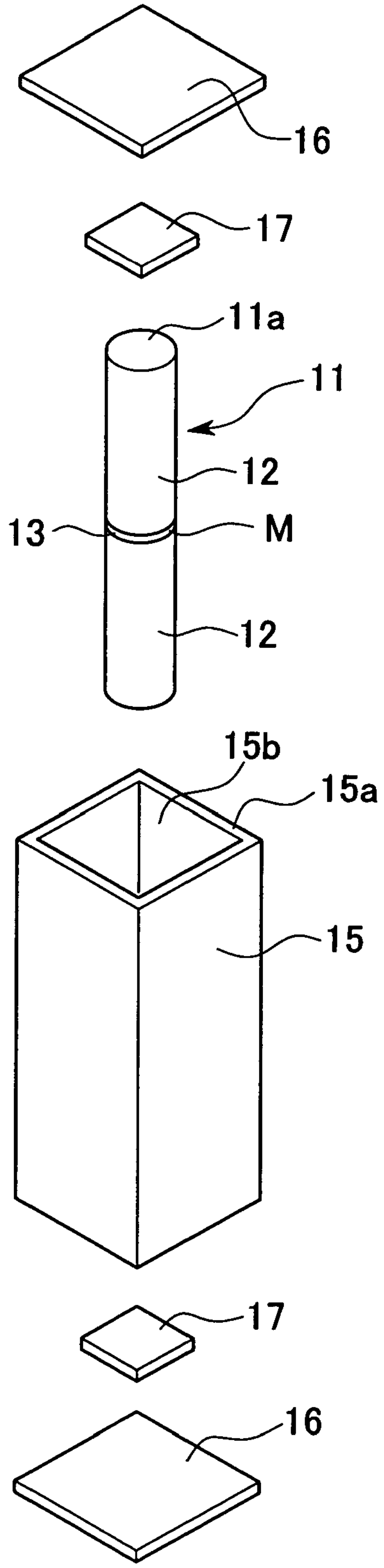
FIG. 2 is an exploded perspective view of the surge absorber of FIG. 1A.

Yet further, although, with the first preferred embodiment of the present invention which has been described above and shown in FIG. 1A, the construction was such that the surge absorption element 11 and the cushion parts 17 were in direct mutual contact with one another, alternative structures are possible without departing from the scope of the present invention, as with a first variant embodiment shown in FIG. 1B and a second variant embodiment shown in FIG. 1C.

With the surge absorber 10' according to the first variant embodiment of the present invention shown in FIG. 1B, the cushion parts 17 are widened in the radial direction, so that they come to be disposed as being sandwiched between the end surfaces 15*a* of the tube shaped ceramic part 15 and the terminal electrodes 16.

With the surge absorber 10" according to the second variant embodiment of the present invention shown in FIG. 1C, in the above described first variant embodiment of the present invention shown in FIG. 1B, additionally, cap electrodes 18 are utilized at both the ends of the surge absorption element 11, these two cap electrodes 18 being pressed at both the ends of surge absorption element 11.

Figure 3A:
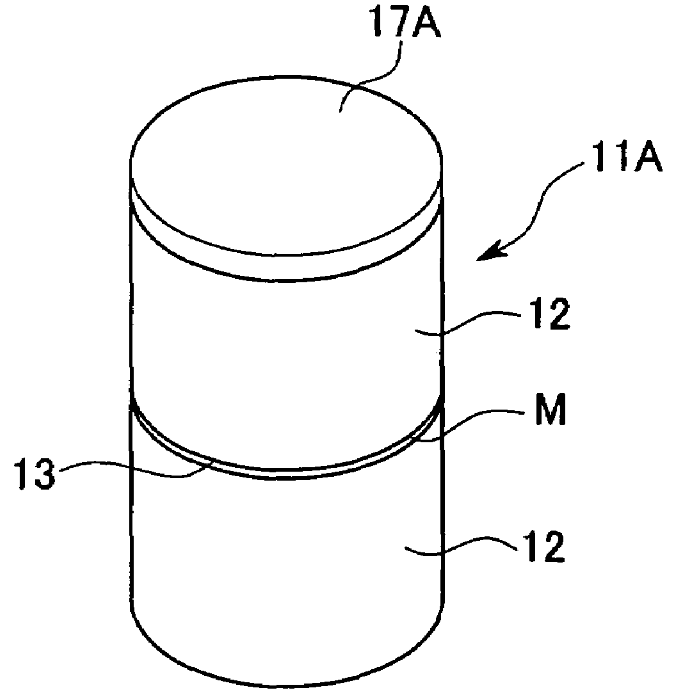
FIG. 3A is a perspective view showing a surge absorption element of a surge absorber according to a second preferred embodiment of the present invention.
Figure 3B:
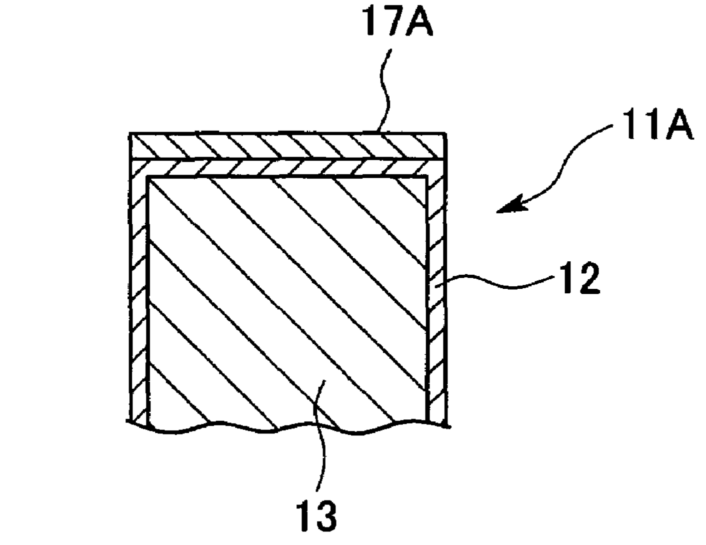
FIG. 3B is a partial cross sectional view of the surge absorber of FIG. 3A.

Next, a second preferred embodiment of the surge absorber of the present invention, similarly equipped with the above described cushion parts 17, will be explained with reference to FIGS. 3A and 3B. It should be understood that, to portions of this second preferred embodiment which correspond to portions of the first preferred embodiment described above, the same reference symbols are affixed, and the detailed description thereof will be curtailed.

In this second preferred embodiment, instead of providing the cushion parts 17 as separate bodies, cushion parts 17*a* are provided unitarily upon both the end surfaces of the surge absorption element 11A. These cushion parts 17A are made in the same manner as the cushion parts 17 of the above described preferred embodiment, and are integrated with the two end surfaces of the surge absorption element 11A by being bonded thereto, or the like.

In this case, the assembling work of the surge absorber 10 by inserting the surge absorption element 11A into the hollow portion 15*a* of the tube shaped ceramic part 15, and by sealing it in together with the seal gases G with the terminal electrodes 16, becomes easy, owing to reduction of the number of separate structural elements.

Furthermore, since the cushion parts 17A are present, the contact with the terminal electrodes 16 becomes reliable and secure, so that a stabilized DC spark over voltage is obtained.

Figure 4:
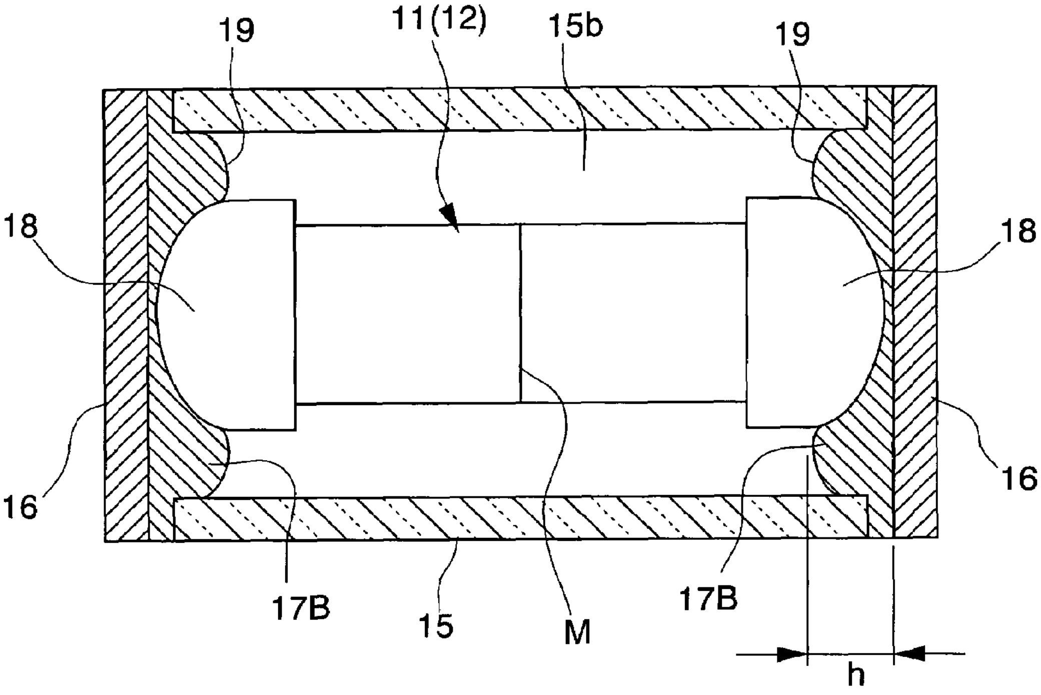
FIG. 4 is a cross sectional view showing a surge absorption element of a surge absorber according to a third preferred embodiment of the present invention.

Next, a third preferred embodiment of the surge absorber of the present invention, similarly equipped with the above described cushion members 17, will be explained with reference to FIG. 4. Again, it should be understood that, to portions of this third preferred embodiment which correspond to portions of the first and second preferred embodiments described above, the same reference symbols are affixed, and the detailed description thereof will be curtailed.

In this third preferred embodiment, cap electrodes 18 are pressed at both the ends of the surge absorption element 11. And cushion parts 17 are provided between the cap electrodes 18 and the terminal electrodes 16. Swollen portions 19 which stick up by a height of h are provided upon these cushion parts 17B, so as to hold the outer circumferential surfaces of the cap electrodes 18 at both ends of the surge absorption element 11. In other words, both end portions of the surge absorption element 11 (in this case, the cap electrodes 18) are held so as to be embedded in the cushion parts 17B upon which the swollen portions 19 are formed by melting. It should be understood that the height h of these swollen portions 19 is considered to be the dimension from the end surfaces of the terminal electrodes 16 to the highest portion of their swellings.

Furthermore, if the cushion parts 17B are made of solder, at the same time as holding the surge absorption elements 11, they are able to seal sealing between both the end surfaces 15*a* of the tube shaped ceramic part 15. It should be understood that it is also possible, in the case of using a surge absorption element 11 (refer to FIGS. 1A and 1B) which has no cap electrodes 18, to provide swollen portions of height h on the cushion parts 17B so as to hold the outer circumferential surface of such a surge absorption element 11 at both its ends.

In this manner, a construction is employed in which both the ends of the surge absorption element 11 are held by the swollen portions 19, then, in addition to the cushion parts functioning as cushioning surfaces as described above, it also becomes possible for them to fix the surge absorption element 11 in place reliably and securely. Due to this, the surge absorption element 11 and the terminal electrodes 16 are reliably and stably kept in contact via the cushion parts 17B, and accordingly the DC spark over voltage is stabilized.

Furthermore it has been verified as the result of experiments that, by providing the swollen portions 19 with a height h which is at least 0.01 mm or greater, it is possible to fix the surge absorption element in place reliably and securely, even in an operational vibration environment.

Although the surge absorbers 10 which have been explained in the previous descriptions have been built with a tube shaped ceramic part 15 which is formed as a tubular quadrangular pillar, the present invention should not be considered as being limited by this constructional detail; for example, it would also be acceptable for the cross sectional shape of this columnar tube shape to be circular, triangular, or polygonal. Furthermore, with regard to the surge absorption element 11 which, in the above described embodiments, is based upon the circular cylindrical shaped ceramic part 13, this also should not be considered as being limited to being of a circular cylindrical shape; more generally, it would be acceptable for this surge absorption element 11 to be of any suitable shape selected together with the shape of the tube shaped ceramic part 15—for example, it could be made in any of various columnar shapes, such as a quadrangular pillar shape or the like, or indeed it could be made in a plate shape.

It should be understood that the structure of the present invention is not to be considered as being limited by the preferred embodiments described above, and, provided that the scope and the gist of the present invention are adhered to, it is possible to implement any of various suitable variations upon the present invention: for example, between the cap electrodes which are pressed at both ends of the surge absorption element and the terminal electrodes, it would be possible to provide cushion part.

Figure 5A:
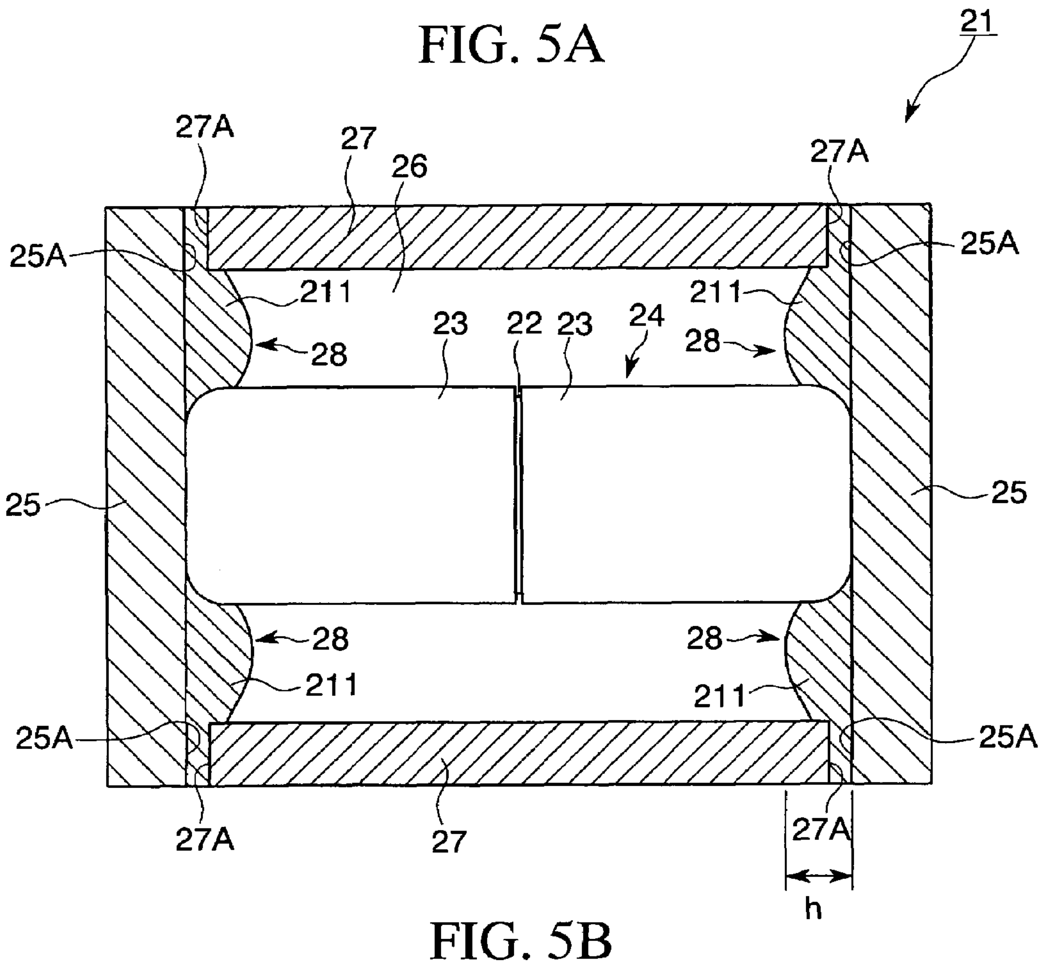
FIG. 5A is a cross sectional view showing a surge absorption element of a surge absorber according to a fourth preferred embodiment of the present invention.
Figure 5B:
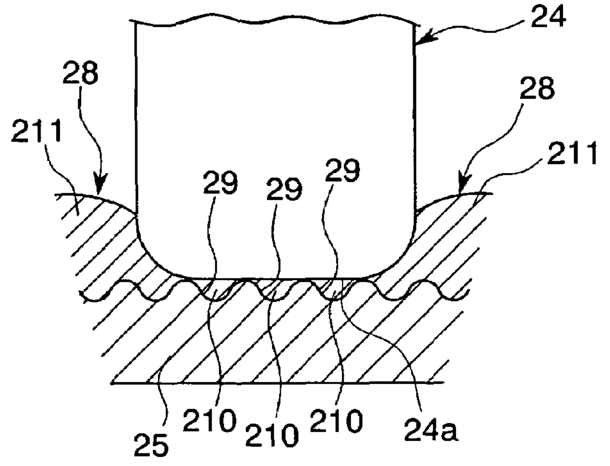
FIG. 5B is an enlarged view of a contact portion between a terminal electrode and a circular cylindrical shaped ceramic member of the FIG. 5A structure.

In the following, a fourth preferred embodiment of the surge absorber of the present invention will be explained with reference to FIGS. 5A and 5B.

The surge absorber 21 of this fourth preferred embodiment is a discharge type surge absorber which utilizes a so called micro gap, and it comprises: a circular cylindrical shaped ceramic part (insulating part) 24 upon which a conductive layer 23 has been formed and has been divided into two at its central portion by a discharge gap 22 which extends around the entire peripheral surface of the part 24; a pair of terminal electrodes 25 which are provided at both ends of this circular cylindrical shaped ceramic member 24 so as to oppose these ends, and which contact the abovementioned conductive layer 23; and a tube shaped ceramic part (insulating tube) 27, which is provided with this pair of terminal electrodes 25 at both its ends, and within which the circular cylindrical shaped ceramic part 24 is internally sealed along with a seal gases 26 in which the composition thereof have been regulated for desirable electrical properties, such as, for example, Ar (argon) or the like.

The circular cylindrical shaped ceramic part 24 is made from an insulating ceramic material such as mullite sintered body or the like, and upon its surface, as the conductive layer 23, a thin film such as TiN (titanium nitride) or the like is coated by a thin film deposition technique such as physical vapor deposition (PVD), chemical vapor deposition (CVD) or the like.

The discharge gap 22 may be formed by any of various machining such as laser cutting, dicing, etching or the like, and may be of any width from 0.01 mm to 1.5 mm and may be provided in any number from 1 to 100; but, in this preferred embodiment of the present invention, a single such discharge gap 22 of width 150 μm is utilized.

The pair of terminal electrodes 25 are made from a metal such as "Kobol" (a register trademark) which is an alloy of Fe (iron), Ni (nickel) and Co (cobalt), or the like.

Each of this pair of terminal electrodes 25 has an outer edge portion 25A against which the end surface 27A of each of the tube shaped ceramic part 27 is contacted, and a solder 28 which includes silver is smeared over the surface of each of these outer edge portions 25A.

Each of this solder layers 28 comprises a number of filler portions (filler material) 210 which act as conductive portions, and which are embedded into uneven gaps 29 which are formed upon the contact surfaces of the pair of terminal electrodes 25, where they come into contact with the end surfaces 24*a* of the circular cylindrical shaped ceramic part 24, and a support portion (support part) 211 which supports the outer circumferential surface of the circular cylindrical shaped ceramic part 24 at the both ends thereof. These uneven gaps 29 are formed in the pair of terminal electrodes 25 and the circular cylindrical shaped ceramic part 24 by concave and convex portions which are caused by dimensional inaccuracies, damage, deformation during machining and the like.

When the terminal electrodes 25 and the circular cylindrical shaped ceramic part 24 are brought into contact, the support portions 211 are made by the solder material layer 28 being bulged upward by this contact, so as to cover the outer circumferential surface of the circular cylindrical shaped ceramic part 24.

It should be understood that the bulging upwards height h of these support portions 211 is the dimension from the end surfaces of the terminal electrode 25 to their highest bulged upwards portions, and, since these highest portions constitute the arc discharge electrodes of the this surge absorber, their height dimension h should be regulated according to the predetermined service life thereof.

The tube shaped ceramic part 27 has a rectangular cross sectional shape, and the outward facing shape of its two end surfaces agrees with the outer shape of the terminal electrodes 25. This tube shaped ceramic part 27 is formed from an insulating ceramic such as, for example, $Al_2O_3$ (alumina) or the like, and upon each of its two end surfaces, after metallization process with, for example, Mo (molybdenum)-W (tungsten), a metal layer is coated by Ni (nickel) plate or the like.

Next, a production method of the chip type surge absorber 21 according to this fourth preferred embodiment of the present invention having the structure described above will be explained.

First, a solder layer 28 which is sufficient in quantity to make one of the support portions 211 is smeared upon one end surface of the terminal electrodes 25, and the circular cylindrical shaped ceramic part 24 is loaded upon the central region of this first terminal electrode 25, so as to establish contact between this first terminal electrode 25 and the circular cylindrical shaped ceramic part 24. Next, the end surface of the tube shaped ceramic part 27 is loaded upon the outer edge portion 25A of this first terminal electrode 25.

And next, a solder layer 28 is mounted upon the other end surface of the tube shaped ceramic member 27, and the other one of the terminal electrodes 25 is loaded on top of it, and thereby the device is set up in the temporary assembly.

Next, the sealing process by which the circular cylindrical shaped ceramic part 24 is sealed together with Ar gas inside the container which is constituted by the pair of terminal electrodes 25 and the tube shaped ceramic part 27 will be explained.

By heating processing the parts in the above described temporary assembly in an Ar (argon) atmosphere, the solder layers 28 are melted, and the terminal electrodes 25 are bonded to the tube shaped ceramic part 27 at both its ends. At this time, due to this melting, the filler portions 210 of the solder layer 28 are buried into the uneven gaps 29 which are present between the end surfaces 24*a* of the circular cylindrical shaped ceramic part 24 and the terminal electrodes 25. Furthermore, the support portions 211 which are formed by the surface tension of the solder layers 28 now engulf the two end portions of the circular cylindrical shaped ceramic part 24, so as to support them.

Here, the pressure of the seal gases 26 is set so that, during the cooling process, it will arrive within the range of from 1 torr to 600 torr. Due to this, a force is applied in the compression direction to the terminal electrodes 25 during the cooling process.

After this, the production of this chip type surge absorber 21 is completed by a coating process of Ni (nickel) plate or Sn (tin) plate.

Figure 6:
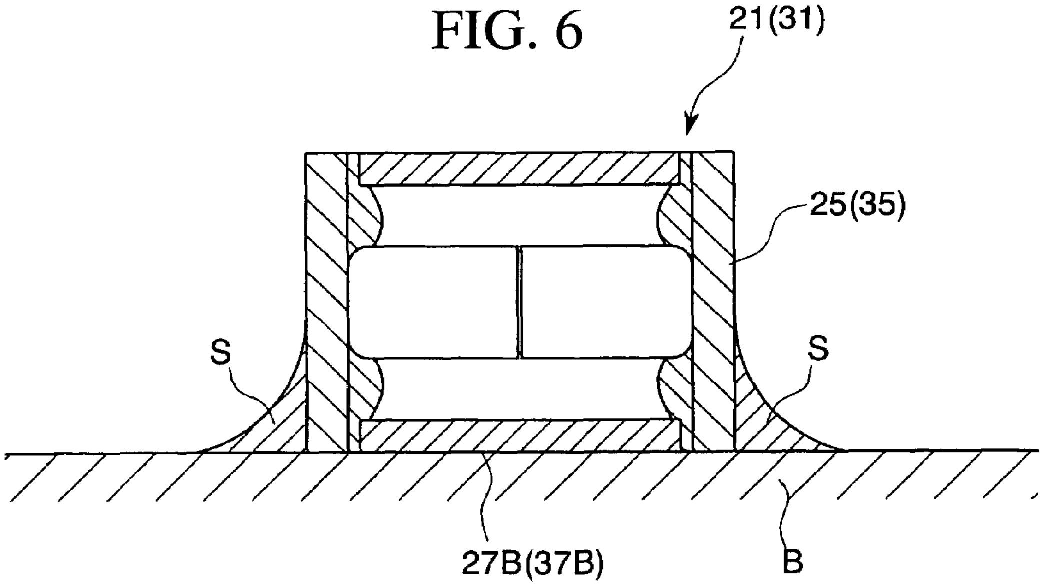
FIG. 6 is a cross sectional view showing an example of a surge absorber according to the present invention as mounted to a circuit board.

As for example shown in FIG. 6, the surge absorber 21 which has been produced by the above described process is used by being mounted upon a substrate B of a printed circuit board or the like, with one side surface of the tube shaped ceramic part 27 being the mounting surface 27B, and by the substrate B and the outer surfaces of the pair of terminal electrodes 25 being bonded together and fixed with solder S.

According to this surge absorber 21, the contact area between the terminal electrodes 25 and the circular cylindrical shaped ceramic part 24 is increased by filling in the uneven gaps 29 which are formed in the terminal electrodes 25 and in the contacting surfaces 24*a* of the circular cylindrical shaped ceramic part 24 by dimensional inaccuracies, damage, deformation during machining, and the like with the solder layer 28 which is a conductive filler material. As a result, it is possible to obtain sufficiently good ohmic contact between the terminal electrodes 25 and the conductive layer 23, and accordingly the electrical properties of this surge absorber 21, such as DC spark over voltage and so on, are stabilized.

Furthermore, it is possible to stabilize the DC spark over voltage by the circular cylindrical shaped ceramic part 24 being fixed by the support portions 211 to the vicinity of the central portions of the terminal electrodes 25, or to the peripheral portions thereof, so that it is possible to anticipate an enhancement of the service life of this surge absorber 21.

Yet further, by making the pressure of the seal gases 26 which is included between the pair of terminal electrodes 25 and the tube shaped ceramic part 27 be from 1 torr to 600 torr, a force in the compression direction is applied to these two terminal electrodes 25, so that, along with ohmic contact being better ensured between the terminal electrodes 25 and the conductive layer 23, also, after the cooling process has been completed, it is possible to prevent the occurrence of slow leakage with atmospheric air flowing in between the terminal electrodes 25 and the tube shaped ceramic part 27.

Figure 7A:
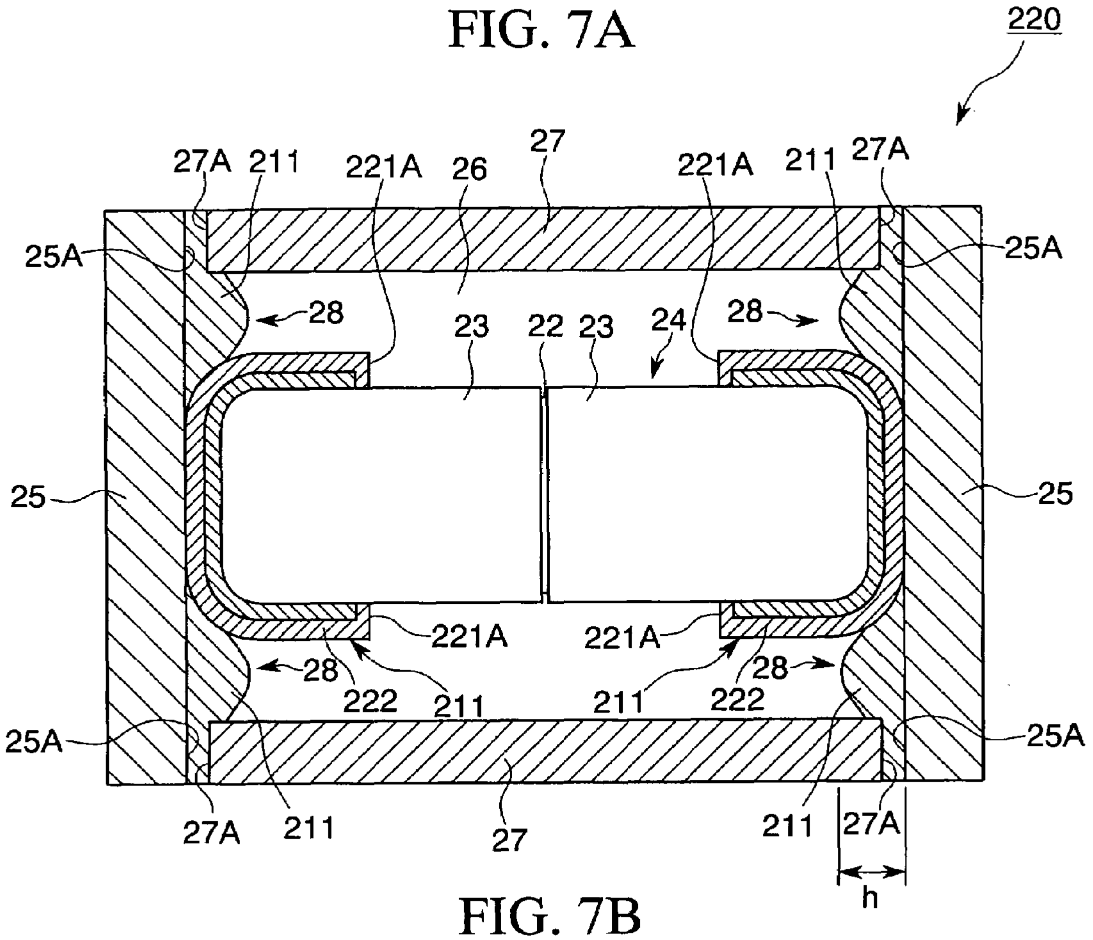
FIG. 7A is a cross sectional view showing a surge absorber according to a fifth preferred embodiment of the present invention.
Figure 7B:
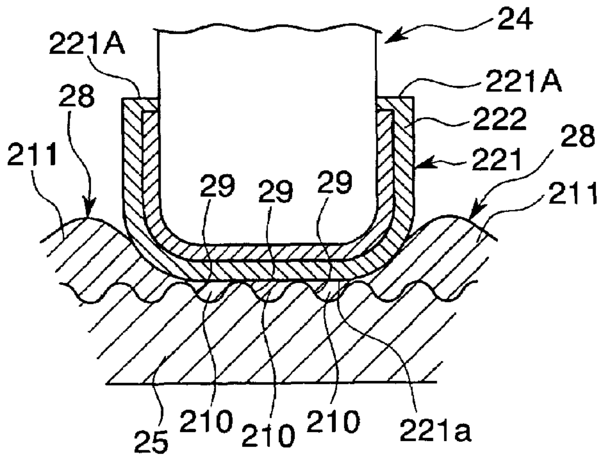
FIG. 7B is an enlarged view of a contact portion between a terminal electrode and a circular cylindrical shaped ceramic member of the FIG. 7A structure.

Next, a fifth preferred embodiment of the surge absorber of the present invention will be explained with reference to FIGS. 7A and 7B.

It should be understood that the basic structure of this fifth preferred embodiment of the present invention is the same as that of the above described fourth preferred embodiment, with only certain other constructional elements being added thereto. Accordingly, in FIGS. 7A and 7B, to portions of this fifth preferred embodiment which correspond to portions of the fourth preferred embodiment described above and shown in FIGS. 5A and 5B, the same reference symbols are affixed, and the detailed description thereof will be curtailed.

The point in which this fifth preferred embodiment differs from the fourth preferred embodiment described above is that, while with the surge absorber 21 of the fourth preferred embodiment the structure was such that the circular cylindrical shaped ceramic member 24 was directly contacted against the terminal electrodes 25, by contrast, with the surge absorber 220 of this fifth preferred embodiment, the structure is such that the circular cylindrical shaped ceramic part 24 contacts the terminal electrodes 25, not directly, but via a pair of cap electrodes (metallic parts) 221 which are formed in the shape of bowls.

This pair of cap electrodes 221 have lower hardness than the circular cylindrical shaped ceramic part 24, so that they can be relatively easily plastically deformed; they are made out of a metal such as, for example, stainless steel or the like, and their external circumferential portions are made with a roughly letter-U cross sectional shape.

An oxidized layer 222 of average film thickness 0.01 μm or greater is formed upon the surface of each of the pair of cap electrodes 221 by oxidation process.

The solder layers 28 comprise the filler portions 210 which are embedded into the uneven gaps 29 which are formed upon the contact surfaces of the pair of terminal electrodes 25, where they come into contact with the end surfaces 221*a* of the cap electrodes 221, and support portions 211 which support the outer circumferential surfaces of the cap electrodes 221 at both ends of the cap electrodes 221. Furthermore, the height h of the support portions 211 is made to be lower than the height of the cap electrodes 221. Due to this, the mutually opposing surfaces of the cap electrodes 221 come to be the arc discharge electrode surfaces 221A.

Next, a production method of the surge absorber 220 according to this fifth preferred embodiment of the present invention having the structure described above will be explained.

First, the surfaces of the pair of cap electrodes 221 are subjected to oxidization process, for example in the atmosphere at a temperature of about 500° C. for a time period of about 30 minutes, and thereby an oxide layer 222 of average film thickness of 0.01 μm or greater is formed upon them.

After this, the pair of cap electrodes 221 are pressed to the two ends of the circular cylindrical shaped ceramic part 24, and the surge absorber 220 is then production method which is identical to that utilized in the case of the fourth preferred embodiment, described above.

This surge absorber 220 according to the fifth preferred embodiment of the present invention functions in the same manner as the surge absorber 1 according to the fourth preferred embodiment of the present invention described above, and provides the same beneficial results; but additionally, by forming the oxide layer 222 of average film thickness 0.01 μm or greater upon the cap electrodes 221 by oxidization process, it is possible to reap the further advantage of chemical (thermodynamic) stability at the arc discharge electrode surfaces 221A, which are high temperature regions. Furthermore, since this oxide layer 222 is excellent with regard to adhesion strength to the cap electrodes 221, it is accordingly possible to display the characteristics of the oxide layer 222 to full advantage. Due to this, even if the cap electrodes 221 reach a high temperature during arc discharge, it is possible sufficiently to suppress sputtering of the metallic component of the cap electrodes 221 to the micro gap 222 or to the inner walls of the tube shaped ceramic member 227 or the like. As a result, the service life of this surge absorber is enhanced.

It should be understood that the present invention should not be considered as being limited to the preferred embodiments described above; rather, it is possible to make various additions and changes to the details of the present invention, provided that its scope is not departed from.

For example, this conductive layer may be made from Ag (silver), Ag (silver)/Pd (palladium) alloy, $SnO_2$ (tin oxide), Al (aluminum), Ni (nickel), Cu (copper), Ti (titanium), Ta (tantalum), W (tungsten), SiC (silicon carbide), BaAl, C (carbon), Ag (silver)/Pt (platinum) alloy, $TiO_2$ (titanium dioxide), TiC (titanium carbide), TiCN (titanium carbide nitride), or the like.

Furthermore, the terminal electrodes may be made from a Cu (copper) or Ni (nickel) type alloy; and the metallized layer on the two end surfaces of the tube shaped ceramic part may be made from Ag (silver), Cu (copper), Au (gold), or the like.

Furthermore, the composition of the seal gases is regulated in order to yield the desired electrical properties; for example, air may be acceptable, or any of Ar (argon), $N_2$ (nitrogen), Ne (neon), He (helium), Xe (xenon), $H_2$ (hydrogen), $SF_6$, $CF_4$, $C_2F_6$, $C_3F_8$, $CO_2$ (carbon dioxide), or a mixture thereof may be used.

Figure 8A:
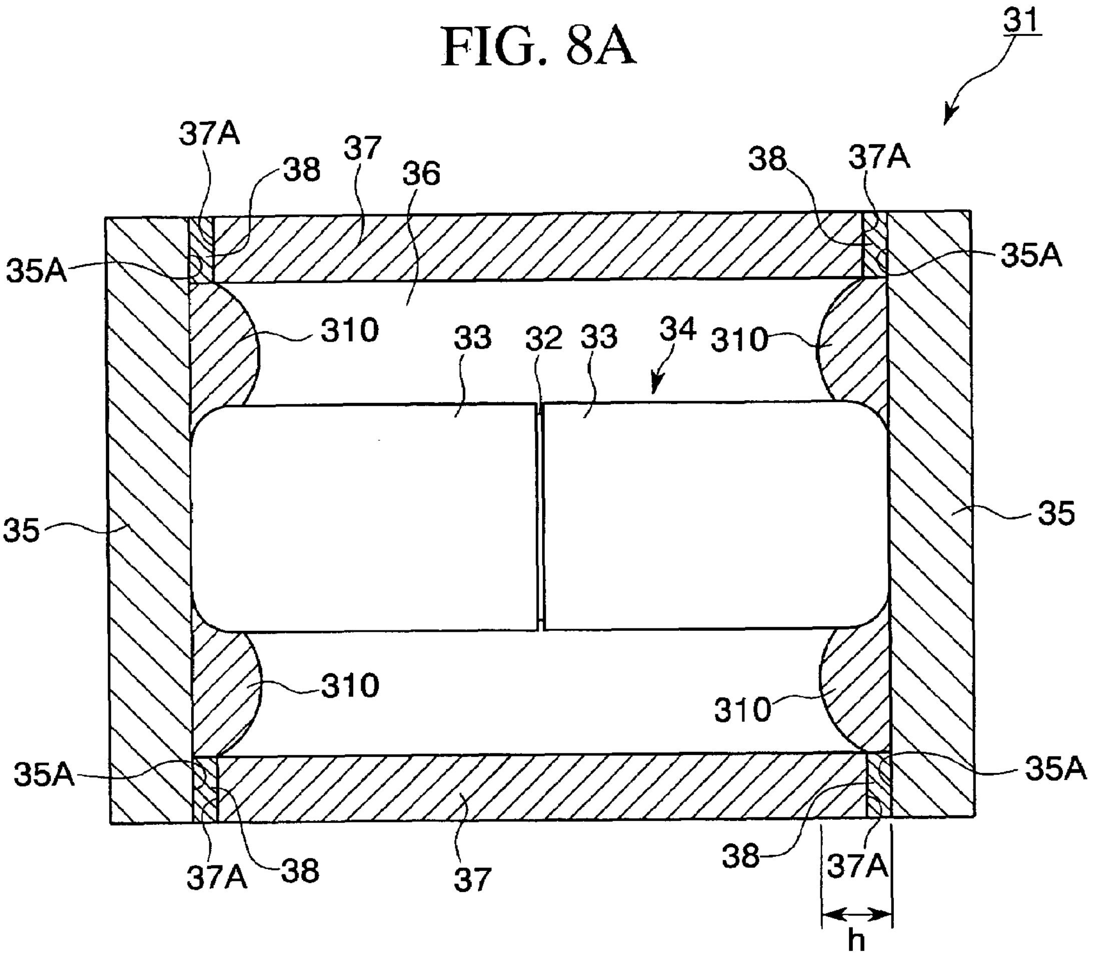
FIG. 8A is a cross sectional view showing a surge absorber according to a sixth preferred embodiment of the present invention.
Figure 8B:
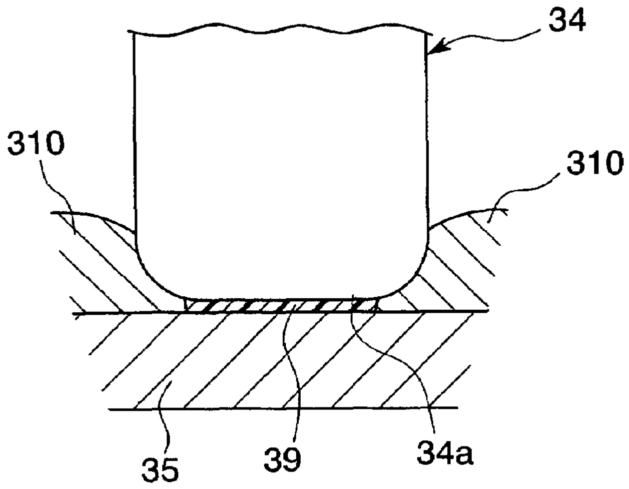
FIG. 8B is an enlarged view of a contact portion between a terminal electrode and a circular cylindrical shaped ceramic member of the FIG. 8A structure.

In the following, a sixth preferred embodiment of the surge absorber of the present invention will be explained with reference to FIGS. 8A and 8B.

The surge absorber 31 of this sixth preferred embodiment is a discharge type surge absorber which utilizes a so called micro gap, and it comprises: a circular cylindrical shaped ceramic parts (insulating part) 34 upon which a conductive layer 33 has been formed and has been divided into two at its central portion by a discharge gap 32 which extends around the entire peripheral surface of the member 34; a pair of terminal electrodes 35 which are provided at both ends of this circular cylindrical shaped ceramic part 34 so as to oppose these ends, and which contact the abovementioned conductive layer 33; and a circular cylindrical shaped ceramic member 34, which is provided with this pair of terminal electrodes 35 at both its ends, and within which the circular cylindrical shaped ceramic part 34 is internally sealed along with seal gases 36, such as, for example, Ar (argon) or the like, seal gases composition have been regulated for desirable electrical properties.

The circular cylindrical shaped ceramic part 34 is made from an insulating ceramic material such as mullite sintered body or the like, and upon its surface, as the conductive layer 33, a thin film such as TiN (titanium nitride) or the like is formed by a thin film deposition technique such as physical vapor deposition (PVD), chemical vapor deposition (CVD) or the like.

The discharge gap 32 may be formed by any of various machining such as laser cutting, dicing, etching or the like, and may be of any width from 0.01 mm to 1.5 mm and may be provided in any number from 1 to 100; but, in this preferred embodiment of the present invention, a single such discharge gap 22 of width 150 μm is utilized.

The pair of terminal electrodes 35 are made from a metal such as "Kobol" (a register trademark) which is an alloy of Fe (iron), Ni (nickel) and Co (cobalt), or the like, and they comprise circumferential edge portions 35A, each of which is bonded to one of the two end surfaces 37A of the tube shaped ceramic member 37 with a solder 38 which is composed of Ag (silver)-Cu (copper).

Furthermore, the pair of terminal electrodes 35 and the two end surfaces 34*a* of the circular cylindrical shaped ceramic part 34 are bonded together with an activated silver solder (a conductive portion) 39, which is a bonding material which is conductive and which is made from Ag (silver)-Cu (copper)-Ti (titanium).

The outer circumferential surface of the circular cylindrical shaped ceramic part 34 at both its ends are supported by glass material (support portion) 310 which have poor affinity with respect to the conductive layer 33, the terminal electrodes 35, the solder 38, and the activated silver solder 39. The height h by which each of these glass materials bulges upwards is the dimension from the end surface of the terminal electrode 35 to its highest bulging upwards portion, and is greater than the average thickness of the solder 38, so that it is sufficient for fixing the circular cylindrical shaped ceramic part 34.

The tube shaped ceramic part 37 has a rectangular cross sectional shape, and the outward facing shape of its two end surfaces agrees with the outer shape of the terminal electrodes 35. This tube shaped ceramic part 37 is formed from an insulating ceramic such as, for example, $Al_2O_3$ (alumina) or the like, and upon each of its two end surfaces, after having performed metallization process with, for example, Mo (molybdenum)-W (tungsten), a metal layer is coated by Ni (nickel) plate or the like.

Next, a method for production of the chip type surge absorber 31 according to this sixth preferred embodiment of the present invention having the structure described above will be explained.

First, an appropriate quantity of the activated silver solder 39 is smeared upon the central portion of one of the terminal electrodes 35, and the circular cylindrical shaped ceramic part 34 is loaded upon this central region of this first terminal electrode 35, so as to establish contact between this terminal electrode 35 and the circular cylindrical shaped ceramic part 34. Next, an appropriate quantity of the glass material 310 is smeared in the peripheral region of this first terminal electrode 35, around the abovementioned central region thereof. Finally, an appropriate quantity of the solder layer 38 is smeared upon the outer edge portion 35A of this terminal electrode 35, and the end surface of the tube shaped ceramic part 37 is loaded upon this outer edge portion 35A.

Furthermore, the solder layer 38 is mounted upon the end portion of the other end surface of the tube shaped ceramic part 37, and, in the same manner as above, the other one of the terminal electrodes 35, with the activated silver solder 39, the glass material 310, and the solder material 38 appropriately smeared on it, is loaded on top of the assembly, and thereby the device is set up in the temporary assembly.

Next, the sealing process by which the circular cylindrical shaped ceramic part 34 is sealed together with Ar gas inside the container which is constituted by the pair of terminal electrodes 35 and the tube shaped ceramic part 37 will be explained.

By heating processing the parts in the above described temporary assemble in an Ar (argon) atmosphere, the solder layers 38, the activated silver solder layers 39, and the glass material masses 310 are melted. At this time, due to the melting of the solder layers 38, the terminal electrodes 35 and the tube shaped ceramic part 37 are bonded together. Moreover, due to the melting of the activated silver solder layers 39, the terminal electrodes 35 and the circular cylindrical shaped ceramic part 34 are bonded together. Furthermore, by the melting of the glass material masses 310, the swollen portions which are now formed by these glass material masses 310 engulf the two end portions of the circular cylindrical shaped ceramic part 34, so as to support them.

Here, the pressure of the seal gases 36 is set so that, during the cooling process, it will arrive within the range of from 1 torr to 600 torr. Due to this, a force is applied in the compression direction to the terminal electrodes 35 during the cooling process.

After this, the production of this chip type surge absorber 31 is completed by a coating process of Ni (nickel) plate or Sn (tin) plate.

As for example shown in FIG. 6, the surge absorber 31 according to this sixth preferred embodiment of the present invention which has been produced by the above described process is used, just like the surge absorber 21 according to the fourth preferred embodiment of the present invention described above, by being mounted upon a substrate B of a printed circuit board or the like, with one side surface of the tube shaped ceramic part 37 being the mounting surface 37B, and by the substrate B and the outer surfaces of the pair of terminal electrodes 35 being bonded together and fixed with solder S.

According to this surge absorber 31, the electrical contact between the terminal electrodes 35 and the circular cylindrical shaped ceramic part 34 is ensured by the bonding together of these terminal electrodes 35 and the end surfaces 34A of this circular cylindrical shaped ceramic part 34 by the activated silver solder layers 39 which are conductive. Due to this, it is possible to obtain sufficiently good ohmic contact between the terminal electrodes 35 and the conductive layer 33, and accordingly the electrical properties of this surge absorber 31, such as DC spark over voltage and so on, are stabilized.

Furthermore, it is possible to stabilize the DC spark over voltage by the circular cylindrical shaped ceramic part 34 being fixed by the glass material masses 310 to the vicinity of the central portions of the terminal electrodes 35, or to the peripheral portions thereof, so that it is possible to anticipate an enhancement of the service life of this surge absorber 31. Here, the circular cylindrical shaped ceramic part 34 is reliably and securely fixed, due to the fact that the glass material 310 has poor affinity with respect to the conductive layer 33, the terminal electrodes 35, the solder layer 38, and the activated silver solder 39, i.e. cannot easily wet them.

Yet further, by making the pressure of the seal gases 36 which is included between the pair of terminal electrodes 35 and the tube shaped ceramic part 37 be from 1 torr to 600 torr, a force in the compression direction is applied to these two terminal electrodes 35, so that, along with ohmic contact being better ensured between the terminal electrodes 35 and the conductive layer 33, also, after the cooling process has been completed, it is possible to prevent the occurrence of slow leakage with atmospheric air flowing in between the terminal electrodes 35 and the insulating tube 34.

It should be understood that, with this sixth preferred embodiment of the present invention, the material for the portions 310 which support the two ends of the circular cylindrical shaped ceramic part 34 may also be the same material as the solder layer 38, or, alternatively, as the activated silver solder material 39. At this time, since the portions 310 constitute the highest portions, the bulging upwards height h thereof should be regulated according to the predetermined service life which are desired for this surge absorber.

Figure 9A:
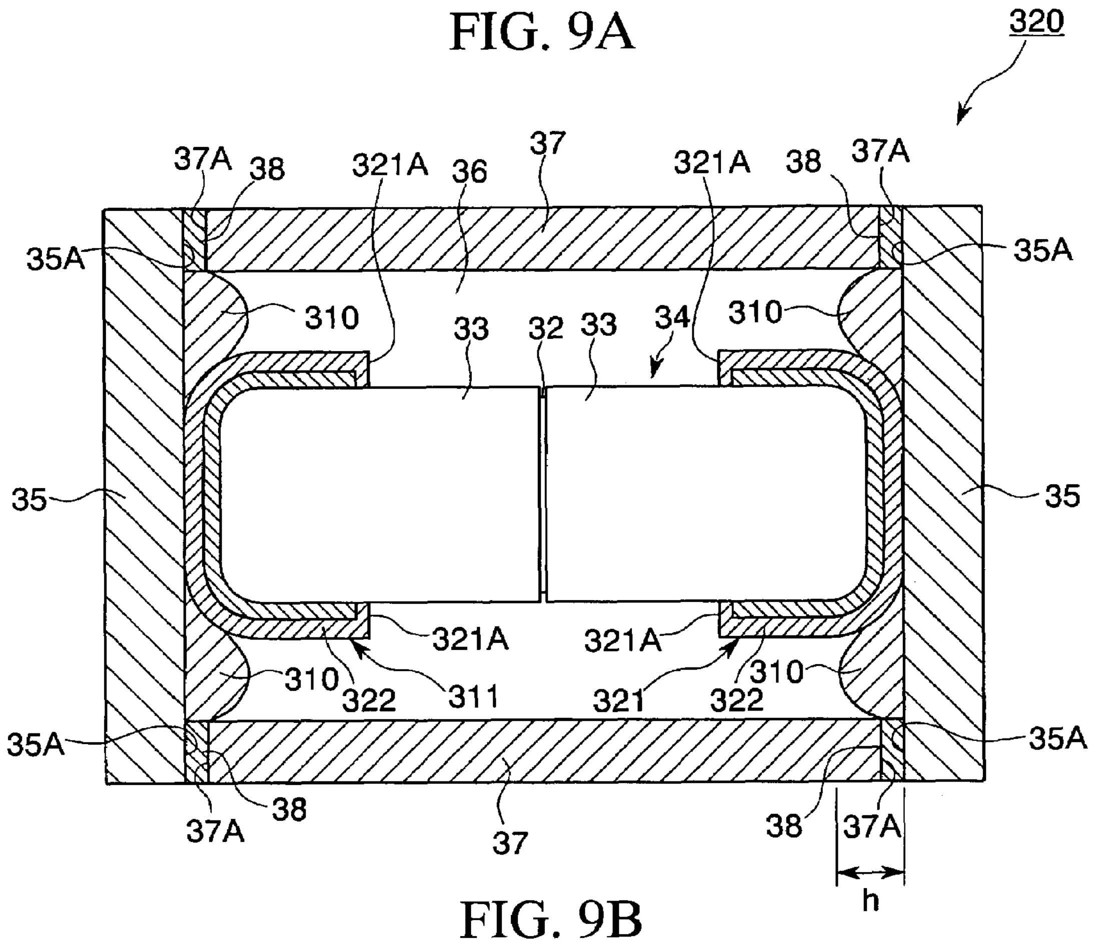
FIG. 9A is a cross sectional view showing a surge absorber according to a seventh preferred embodiment of the present invention.
Figure 9B:
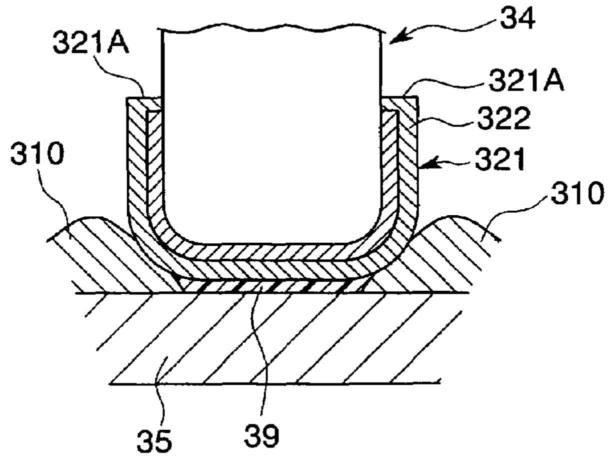
FIG. 9B is an enlarged view of a contact portion between a terminal electrode and a circular cylindrical shaped ceramic member of the FIG. 9A structure.
Figure 10:
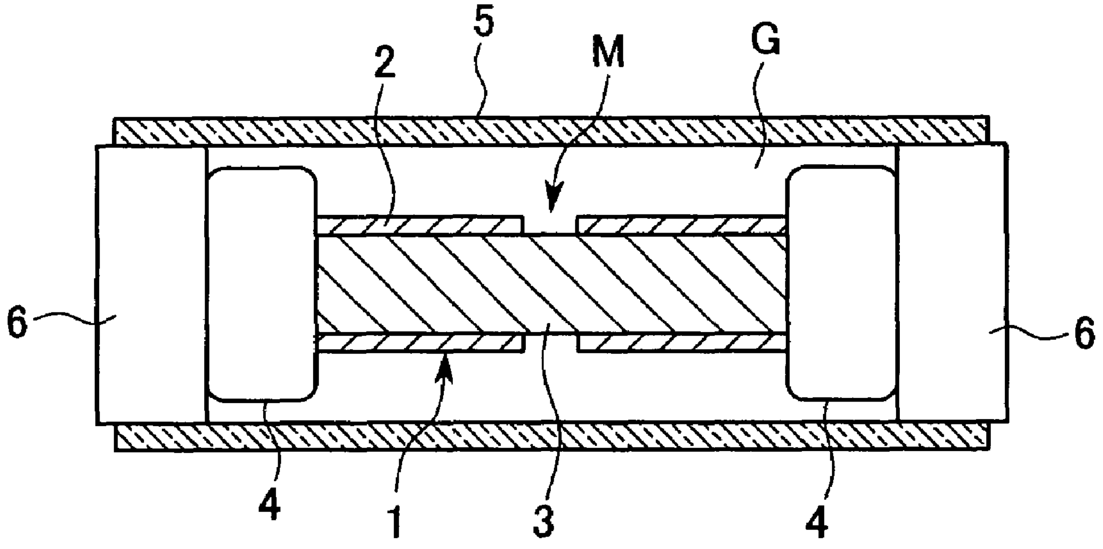
FIG. 10 is a cross sectional view showing an example of a prior art surge absorber.

Next, a seventh preferred embodiment of the surge absorber of the present invention will be explained with reference to FIGS. 9A and 9B.

It should be understood that the basic structure of this seventh preferred embodiment of the present invention is the same as that of the above described sixth preferred embodiment, with only certain other constructional elements being added thereto. Accordingly, in FIGS. 9A and 9B, to portions of this seventh preferred embodiment which correspond to portions of the sixth preferred embodiment described above and shown in FIGS. 8A and 8B, the same reference symbols are affixed, and the detailed description thereof will be curtailed.

The point in which this seventh preferred embodiment differs from the sixth preferred embodiment described above is that, while with the surge absorber 31 of the sixth preferred embodiment the structure was such that the circular cylindrical shaped ceramic part 34 was directly contacted against the terminal electrodes 35, by contrast, with the surge absorber 320 of this seventh preferred embodiment, the structure is such that the circular cylindrical shaped ceramic part 34 contacts the terminal electrodes 35, not directly, but via a pair of cap electrodes (metallic parts) 321 which are formed in the shape of bowls.

This pair of cap electrodes 321 have lower hardness than the circular cylindrical shaped ceramic part 34, so that they can be relatively easily plastically deformed; they are made out of a metal such as, for example, stainless steel or the like, and their external circumferential portions are made with a roughly letter-U cross sectional shape.

An oxidized layer 322 of average film thickness 0.01 μm or greater is formed upon the surface of each of the pair of cap electrodes 321 by oxidation process. Furthermore, the mutually opposing surfaces of the cap electrodes 321 constitute arc discharge electrode surfaces 321A.

It should be understood that, in this seventh preferred embodiment of the present invention, the height h of the masses of glass material 310, just as in the case of the sixth preferred embodiment of the present invention described above, is set to be greater than the average thickness of the solder layer 38, so that it should be sufficient to fix the circular cylindrical shaped ceramic part 34 and the cap electrodes 321 securely.

Next, a production method of the surge absorber 320 according to this seventh preferred embodiment of the present invention having the structure described above will be explained.

First, the surfaces of the pair of cap electrodes 321 are subjected to oxidization process, for example in the atmosphere at a temperature of about 500° C. for a time period of about 30 minutes, and thereby an oxide layer 322 of average film thickness of 0.01 μm or greater is formed upon them.

After this, the pair of cap electrodes 321 are pressed to the two ends of the circular cylindrical shaped ceramic part 34, and the surge absorber 320 is then produced by a method which is identical to that utilized in the case of the sixth preferred embodiment, described above.

This surge absorber 320 according to the seventh preferred embodiment of the present invention functions in the same manner as the surge absorber 31 according to the sixth preferred embodiment of the present invention described above, and provides the same beneficial results; but additionally, by forming the oxide layer 322 of average film thickness 0.01 μm or greater upon the cap electrodes 321 by oxidization process, it is possible to reap the further advantage of a stabilized chemical (thermodynamic) stability at the arc discharge electrode surfaces 321A, which are high temperature regions. Furthermore, since this oxide layer 322 is excellent with regard to adhesion strength to the cap electrodes 321, it is accordingly possible to display the characteristics of the oxide layer 322 to full advantage. Due to this, even if the cap electrodes 321 reach a high temperature during arc discharge, it is possible sufficiently to suppress sputtering of the metallic component of the cap electrodes 321 to the micro gap 32 or to the inner walls of the tube shaped ceramic part 37 or the like. As a result, the service life of this surge absorber is enhanced.

It should be understood that in this seventh preferred embodiment of the present invention, just as in the case of the sixth preferred embodiment of the present invention described above, the material for the support portions 310 which support the two ends of the circular cylindrical shaped ceramic part 34 via the cap electrodes 321 may also be the same material as the solder layer 38, or, alternatively, as the activated silver solder material 39. At this time, the height h of the bulging upwards portions of the support portions 310 is formed to be lower than the height of the cap electrodes 321, so that the arc discharge electrode surfaces 321A of these cap electrodes constitute the arc discharge portions.

It should be understood that the present invention should not be considered as being limited to the preferred embodiments described above; rather, it is possible to make various additions and changes to the details of the present invention, provided that its scope is not departed from.

For example, the bonding material is not to be considered as being limited to being activated silver solder; it may be any suitable material, provided that, along with being conductive, it is capable of bonding together the circular cylindrical shaped ceramic part and the terminal electrodes, or the cap electrodes and the terminal electrodes.

Moreover, the conductive layer may be made from Ag (silver), Ag (silver)/Pd (palladium) alloy, $SnO_2$ (tin oxide), Al (aluminum), Ni (nickel), Cu (copper), Ti (titanium), Ta (tantalum), W (tungsten), SiC (silicon carbide), BaAl, C (carbon), Ag (silver)/Pt (platinum) alloy, $TiO_2$ (titanium dioxide), TiC (titanium carbide), TiCN (titanium carbide nitride), or the like.

The terminal electrodes may be made from a Cu (copper) or Ni (nickel) type alloy, or may be made using, for example, “Kobal” (a register trademark), which is an alloy of Fe (iron), Ni (nickel), and Co (cobalt).

The metallized layer upon the two end surfaces of the tube shaped ceramic part may be made from Ag (silver), Cu (copper), Au (gold), or the like.

Furthermore, the composition of the seal gases is adjusted in order to yield the desired electrical properties; for example, air may be acceptable, or any of Ar (argon), $N_2$ (nitrogen), Ne (neon), He (helium), Xe (xenon), $H_2$ (hydrogen), $SF_6$, $CF_4$, $C_2F_6$, $C_3F_8$, $CO_2$ (carbon dioxide), or a mixture thereof may be used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. A surge absorber, comprising:

an insulating part upon which is formed a conductive layer which is divided into two separate portions by a discharge gap;

a pair of terminal electrodes which are arranged to oppose said insulating part;

an insulating tube at the ends of which said terminal electrodes are arranged, and which seals said insulating part in its interior along with seal gases; and a conductive portion provided at least between said terminal electrodes and said conductive layer and which is made of a deformable materials, wherein, at each end of the insulating part, said conductive portion comprises a support portion which projects away from the surface of the terminal electrode along an axial direction of the insulating tube in a region between an outer surface of the insulating part and an inner surface of the insulating tube, and which supports an end of said insulating part along its outer circumferential surface, and a portion of the conductive portion which is disposed between an end surface of the insulating part and the terminal electrode has a smaller thickness than the support portion.

2. A surge absorber according to claim 1, wherein said insulating part is of columnar form, and upon which is formed said conductive layer around its circumferential surface;

said pair of terminal electrodes are arranged to oppose said conductive layer at both ends of said insulating part; and said conductive portion comprises a conductive filling material which fills up a gap formed on a surface of said terminal electrode.

3. A surge absorber according to claim 1, wherein said insulating part is of columnar form, and upon which is formed said conductive layer around its circumferential surface;

said pair of terminal electrodes are arranged to oppose said conductive layer at both ends of said insulating part;

a metallic part is arranged between said conductive layers and said terminal electrode; and said conductive portion comprises a conductive filling material which fills up a gap formed on a surface of said terminal electrode.

4. A surge absorber according to claim 2 or claim 3, wherein the pressure of said seal gas is below atmospheric pressure.

5. A surge absorber according to claim 1, wherein said insulating part, is of columnar form, and upon which is formed said conductive layer around its circumferential surface;

said pair of terminal electrodes are arranged to oppose said conductive layer at both ends of said insulating part;

said insulating tube having both its ends bonded with said pair of terminal electrodes with a solder; and said conductive portion comprises a conductive bonding material which bonds said terminal electrodes and said conductive layer.

6. A surge absorber according to claim 1, wherein said insulating part is of columnar form, and upon which is formed said conductive layer around its circumferential surface;

said pair of terminal electrodes are arranged to oppose said conductive layer at both ends of said insulating part;

said insulating tube having both its ends bonded with said pair of terminal electrodes with a solder;

a metallic part is disposed between said terminal electrodes and said conductive layer; and said conductive portion comprises a conductive bonding material, and which bonds said metallic part and said terminal electrodes.

7. A surge absorber according to claim 5 or claim 6, wherein said solder and said bonding material are formed from different materials.

8. A surge absorber according to claim 5 or claim 6, wherein said support portion is formed from a material which is the same as said solder, and which is different from said bonding material.

9. A surge absorber according to claim 5 or claim 6, wherein said support portion is formed from a material which is the same as said bonding material, and which is different from said solder.

10. A surge absorber according to claim 5 or claim 6, wherein said support portion is formed from a material which is different from both said bonding material and said solder.

11. A surge absorber according to claim 5 or claim 6, wherein the pressure of said seal gases is below atmospheric pressure.

12. A surge absorber according to claim 1, comprising:

wherein said insulating part is of columnar form, and upon which is formed said conductive layer around its circumferential surface;

said pair of terminal electrodes are arranged to oppose said conductive layer at both ends of said insulating part; and said conductive portion comprises a conductive cushion part which is provided between said conductive layer and said terminal electrode.

13. A surge absorber according to claim 12, wherein said cushion part is made from any one of metallic plate, metallic foil, foamed metal, and metallic fibers.

14. A surge absorber according to claim 12, wherein, said support portion is a swollen portion of said conductive cushion part.

15. A surge absorber according to claim 1, said insulating tube having flat surfaces at each end of the insulating tube, and said conductive portion being provided across an entire width of at least one end of the insulating tube, and disposed between a flat surface of the insulating tube and a respective opposing flat surface of one of the pair of terminal electrodes.

16. A surge absorber according to claim 1, said insulating part having cap electrodes at each end which are separate from the conductive portion and are provided between the insulating part and the conductive portion.

* * * * *